(12) United States Patent
Zhang et al.

(10) Patent No.: US 9,071,140 B2
(45) Date of Patent: Jun. 30, 2015

(54) CURRENT MODE BUCK-BOOST DC-DC CONTROLLER

(75) Inventors: Hai Bo Zhang, Nanshan (CN); Yan He, Nanshan (CN)

(73) Assignee: STMicroelectronics (Shenzhen) R&D Co. Ltd, Shenzhen (CN)

( * ) Notice: Subject to any disclaimer, the term of this patent is extended or adjusted under 35 U.S.C. 154(b) by 88 days.

(21) Appl. No.: 12/925,130

(22) Filed: Oct. 14, 2010

(65) Prior Publication Data

US 2011/0156683 A1    Jun. 30, 2011

(30) Foreign Application Priority Data

Dec. 31, 2009  (CN) .......................... 2009 1 0265997

(51) Int. Cl.
G05F 1/00   (2006.01)
H02M 3/158  (2006.01)

(52) U.S. Cl.
CPC ................................. H02M 3/1582 (2013.01)

(58) Field of Classification Search
USPC ................. 323/259, 234, 237, 265, 273–275, 323/282–285
See application file for complete search history.

(56) References Cited

U.S. PATENT DOCUMENTS

| | | | |
|---|---|---|---|
| 8,159,181 B2 * | 4/2012 | Greyling | 320/107 |
| 2005/0093526 A1 * | 5/2005 | Notman | 323/282 |
| 2006/0176038 A1 * | 8/2006 | Flatness et al. | 323/282 |
| 2007/0205778 A1 * | 9/2007 | Fabbro et al. | 324/713 |
| 2008/0303499 A1 * | 12/2008 | Chen et al. | 323/282 |
| 2009/0108823 A1 * | 4/2009 | Ho et al. | 323/282 |
| 2009/0251122 A1 * | 10/2009 | Singnurkar | 323/311 |
| 2010/0148737 A1 * | 6/2010 | Li et al. | 323/282 |

* cited by examiner

Primary Examiner — Jeffrey Gblende
(74) Attorney, Agent, or Firm — Gardere Wynne Sewell LLP

(57) ABSTRACT

A current mode DC-DC controller operates with high efficiency even when the input and output voltages are close. Switches selectively connecting an input, ground and an output to inductor terminals are controlled in a buck/boost region to alternate between operation as a buck converter and operation as a boost converter. The number of switches repeatedly changing state is thus reduced, lowering switching losses and improving conversion efficiency. Current through the inductor during operation is sensed and compared to an error value to control switching from buck mode operation to boost mode operation and back.

10 Claims, 5 Drawing Sheets

CURRENT MODE BUCK-BOOST DC-DC CONTROLLER

CROSS-REFERENCE TO RELATED APPLICATION(S) AND CLAIM OF PRIORITY

The present application claims the benefit under 35 U.S.C. §119 to an application filed in the Chinese Intellectual Property Office on Dec. 31, 2009 and assigned Application No. 200910265997.2, the contents of which are herein incorporated by reference.

TECHNICAL FIELD

The present disclosure is directed, in general, to DC-DC controllers, and more specifically, to a current mode DC-DC controller having high efficiency even when generating a desired output voltage that is close to the input voltage.

BACKGROUND

Conversion of a direct current (DC) power supply voltage to a different voltage is employed for various purposes, including for example charging batteries or providing power to selected components within a computer, mobile telephone, or other electronic device. A versatile DC-DC controller should operate as either a "buck" (step-down) controller or a "boost" (step-up) controller, depending on the specific needs of the application, and should preferably operate across a complete range of input-output conversions without discontinuities. However, when changing a power supply voltage to a voltage that is close to that of the power supply, conversion efficiency (the power retained after conversion—that is, the input power less conversion losses) can be unacceptably low.

There is, therefore, a need in the art for an improved DC-DC controller with high efficiency even when generating a desired output voltage that is close to the input voltage.

SUMMARY

A current mode DC-DC controller operates with high efficiency even when the input and output voltages are close. Switches selectively connecting an input, ground and an output to inductor terminals are controlled in a buck/boost region to alternate between operation as a buck converter and operation as a boost converter. The number of switches repeatedly changing state is thus reduced, lowering switching losses and improving conversion efficiency. Current through the inductor during operation is sensed and compared to an error value to control switching from buck mode operation to boost mode operation and back.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 4C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Figure 1A:
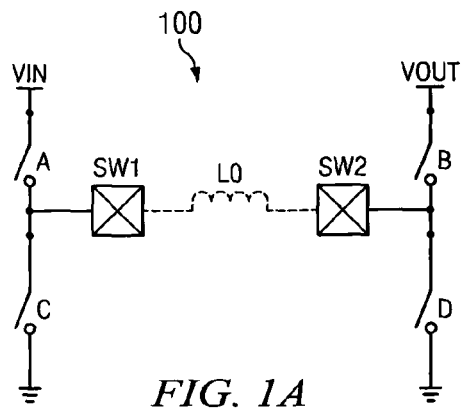
FIG. 1A is a simplified circuit diagram of a high efficiency current mode DC-DC controller in accordance with one embodiment of the present disclosure.

FIG. 1A is a simplified circuit diagram of a high efficiency current mode DC-DC controller in accordance with one embodiment of the present disclosure. Controller 100 includes switches A and C connected in series between an input voltage $V_{IN}$ and ground, and switches B and D connected in series between an output voltage $V_{OUT}$ and ground. An inductor L0, shown as an external inductor connected between integrated circuit package input/output (I/O) connections SW1 and SW2, is connected from the common node between switches A and C and the common node between switches B and D. (Inductor L0 is shown in phantom since it is preferably external to the integrated circuit package containing controller 100, as illustrated below in FIG. 3). Within the exemplary embodiment illustrated, switches A and B may be implemented as p-channel metal oxide semiconductor (pMOS) field effect transistors (FETs) and switches C and D may be implemented as n-channel metal oxide semiconductor (nMOS) FETs.

Figure 1B:
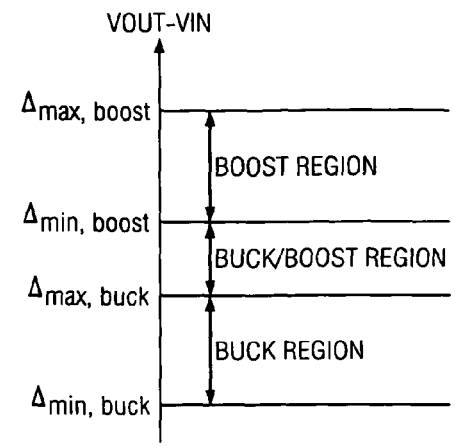
FIG. 1B illustrates ranges of operation for the current mode DC-DC controller of FIG. 1A.

FIG. 1B illustrates ranges of operation for the current mode DC-DC controller of FIG. 1A. When the input voltage $V_{IN}$ is much higher than the desired output voltage $V_{OUT}$, between minimum and maximum differentials $\Delta_{min, buck}$ and $\Delta_{max, buck}$, the controller 100 works in the buck (step-down) region. In the buck region, switch B may be kept on (closed), switch D may be kept off (open) and switches A and C may be controlled by a PWM signal to achieve the required voltage conversion. When the input voltage $V_{IN}$ is much lower than the desired output voltage $V_{OUT}$, between minimum and maximum differentials $\Delta_{min, boost}$ and $\Delta_{max, boost}$, the controller 100 works in the boost (step-up) region. In the boost region, switch A may be kept on, switch C may be kept off, and switches B and D are controlled by a PWM signal. In both cases, only two switches are repeatedly changing state and switching losses are therefore sufficiently low to allow conversion with acceptably high efficiency (greater than 90%).

However, when the input voltage $V_{IN}$ is close to the desired output voltage $V_{OUT}$ (the "buck/boost region" in FIG. 1B), in a voltage mode implementation all four switches A, B, C and D are typically controlled by a PWM signal, substantially increasing switching losses and resulting in unacceptable conversion efficiency. To avoid such switching losses, the current mode DC-DC controller 100 alternates between operation as a buck controller and operation as a boost controller when the input voltage $V_{IN}$ is close to the desired output voltage $V_{OUT}$. Thus, within the buck/boost region, the current mode controller 100 alternates between operating with switches A and C controlled by a PWM signal and operating with switches B and D controlled by a PWM signal. In that manner, only two switches are regularly changing state (except during transitions between buck and boost operation) and the conversion efficiency will be higher than a voltage mode implementation.

Figure 2A:
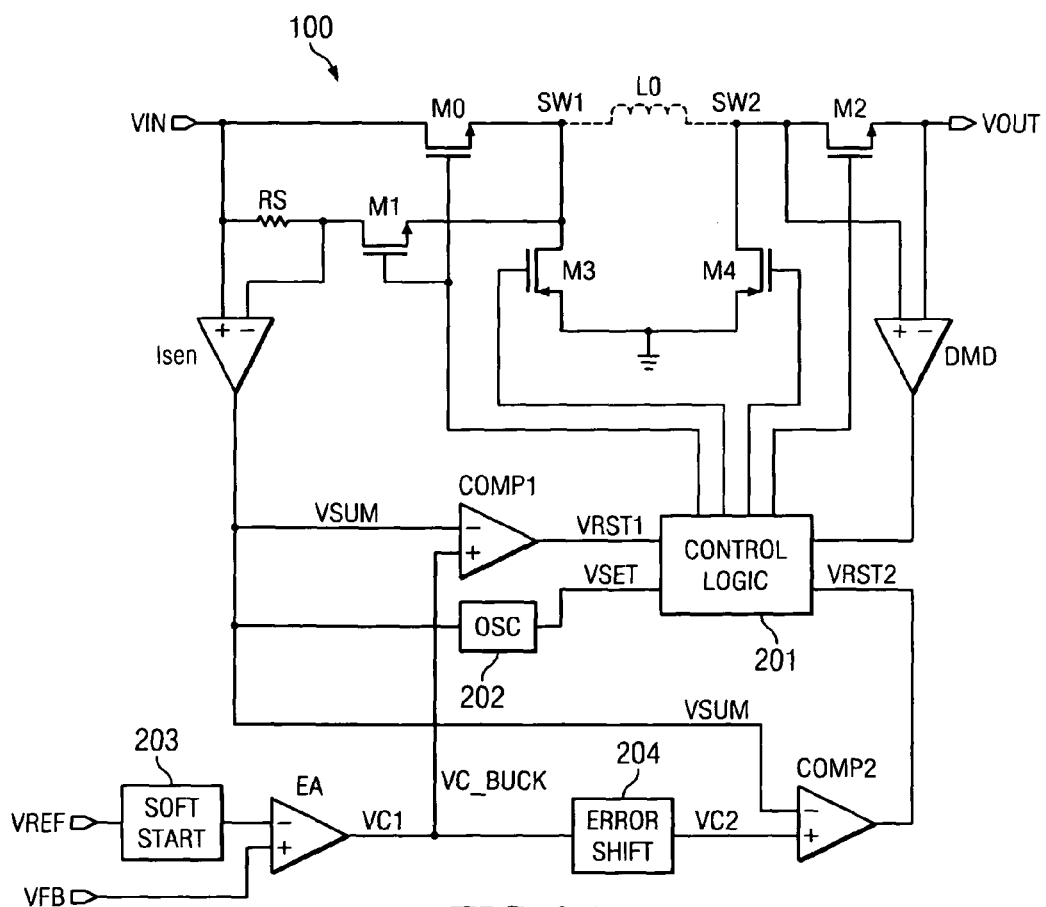
FIG. 2A is a more detailed circuit diagram of the current mode DC-DC controller of FIG. 1A.

FIG. 2A is a more detailed circuit diagram of the current mode DC-DC controller of FIG. 1A. Controller 100 receives the input voltage at the input $V_{IN}$, which is connected to the drain of a pMOS FET M0 (corresponding to switch A in FIG. 1A). The drain of transistor M0 is connected to a terminal SW1. A current sensing resistor $R_S$ and a transistor M1 are serially connected in parallel with transistor M0, with one terminal of the resistor $R_S$ connected to the input $V_{IN}$, the other terminal of the resistor $R_S$ connected to the drain of transistor M1, and the source of transistor M1 connected to terminal SW1. The gates of transistors M0 and M1 are connected together and controlled in tandem by control logic 201.

A terminal SW2 is connected to the drain of a pMOS FET M2 (corresponding to switch B in FIG. 1A), and the source of transistor M2 is connected to output $V_{OUT}$. The drain of nMOS FET M3 (corresponding to switch C in FIG. 1A) is connected to terminal SW1, and the drain of nMOS FET M4 (corresponding to switch D in FIG. 1A) is connected to terminal SW2. The sources of transistors M3 and M4 are both connected to ground. The gates of transistors M2, M3 and M4 are separately controlled, and controlled separately from the gates of transistor M0 and M1, by control logic 201. An inductor L0 is connected between terminals SW1 and SW2. Control logic 201 controls transistors M0, M1, M2, M3 and M4 to operate, together with inductor L0, in different modes as a boost converter, as a buck converter, or as an alternating buck/boost converter as described in further detail below.

An operational amplifier (op-amp) $I_{SEN}$ has the inverting input connected to one terminal of resistor $R_S$ and the non-inverting input connected to the other terminal of resistor $R_S$, generating a generally sawtooth output voltage $V_{SUM}$ corresponding to pulses applied to the gates of transistors M0 (and M1) and M3 by control logic 201 (or pulses applied to the gates of transistors M2 and M4, with transistor M0 kept on). The output of op-amp $I_{SEN}$ is supplied to the inverting inputs of comparators COMP1 and COMP2, with control voltages VC1 and VC2 supplied to the non-inverting inputs of comparators COMP1 and COMP2, respectively. The outputs of comparators COMP1 and COMP2 are control voltages $V_{RST1}$ and $V_{RST2}$, respectively, and are supplied to control logic 201.

The output $V_{SUM}$ of op-amp $I_{SEN}$ is also applied to a voltage-controlled oscillator 202, the output of which is supplied to control logic 201.

Control voltages VC1 and VC2 are produced based on a reference voltage $V_{REF}$ and a feedback voltage $V_{FB}$ applied to the non-inverting and inverting inputs, respectively, of an error amplifier EA. Before being supplied to the non-inverting input, reference voltage $V_{REF}$ is first filtered by a resistive-capacitive soft-start circuit 203 that inhibits excessive power dissipation when the controller 100 is powered up from a non-powered state. The feedback voltage $V_{FB}$ is produced by driving an external resistor using the output $V_{OUT}$. The output of error amplifier EA is control voltage VC1, and is passed through a DC level shifter 204 to produce control voltage VC2.

A discontinuous mode detection amplifier DMD is connected at the non-inverting input to the drain of transistor M2 and at the inverting input to the source of transistor M2. The output of amplifier DMD is supplied to control logic 201.

Those skilled in the relevant art will recognize that the full structure and operation of the high-efficiency current mode DC-DC controller is not depicted in the drawings or described herein. Instead, for simplicity and clarity, only so much of the structure and operation as is unique to the present disclosure or necessary for an understanding of the present disclosure is depicted and described. For example, the particular circuits enabling the DC-DC controller to operate simply as a buck converter in one mode or as a boost converter in another mode are not depicted or described in greater detail than is found in FIGS. 1A and 1B and the accompanying description. Nonetheless, those skilled in the relevant art will be able to readily implement such modes of operation.

Figure 2B:
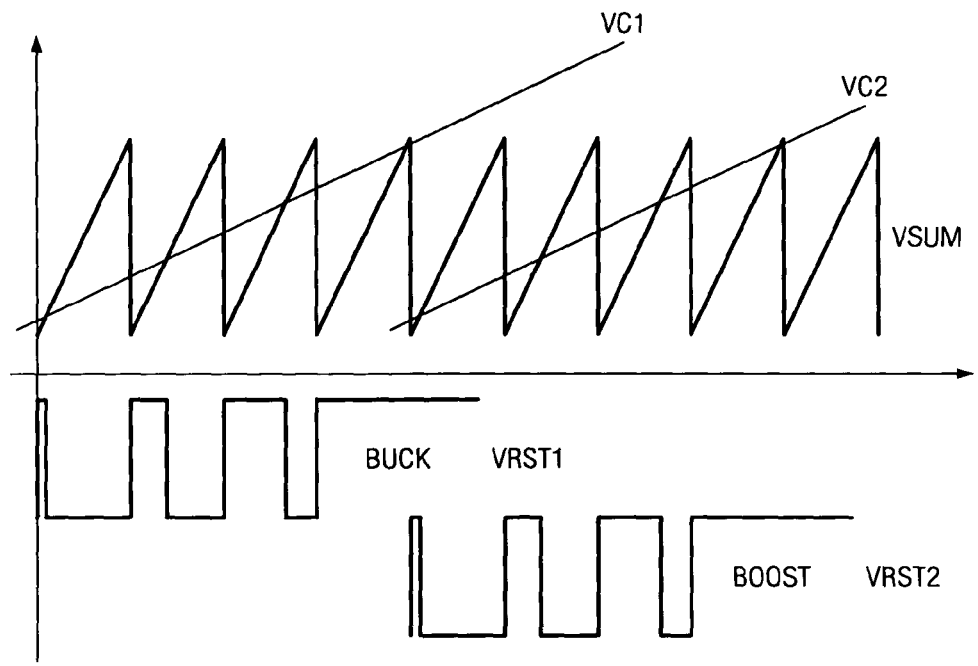
FIG. 2B illustrates selected signals during operation of the current mode DC-DC controller of FIG. 1A in the buck/boost region of FIG. 1B.

FIG. 2B illustrates selected signals during operation of the current mode DC-DC controller of FIG. 1A in the buck/boost region of FIG. 1B. Based on the sawtooth voltage $V_{SUM}$ output by current sensing op-amp $I_{SEN}$, error-based feedback control voltage VC1 increases during a buck phase of the alternative buck-boost operation from a minimum level to a level equaling or exceeding the maximum value of current sensing output $V_{SUM}$. The controller 100 then switches to boost operation, with error-based (and level shifted) feedback control voltage VC2 increasing during the boost phase of buck-boost operation from a minimum level to a level equaling or exceeding the maximum value of current sensing output $V_{SUM}$. The controller 100 then switches back to buck operation, and the cycle repeats. The pulse widths for the result $V_{RST1}$ of comparing $V_{SUM}$ with VC1 increase with consecutive cycles of $V_{SUM}$ as VC1 increases, and the pulse widths for the result $V_{RST2}$ of comparing $V_{SUM}$ with VC2 increase with consecutive cycles of $V_{SUM}$ as VC2 increases. While not expressly depicted, it should be apparent to those skilled in the art that control logic 201 may include latches that are set and reset by signals $V_{SET}$ from oscillator 202, $V_{RST1}$ from comparator COMP1 and $V_{RST2}$ from comparator COMP2, with the latches controlling switching between buck and boost phases of operation.

Figure 3:
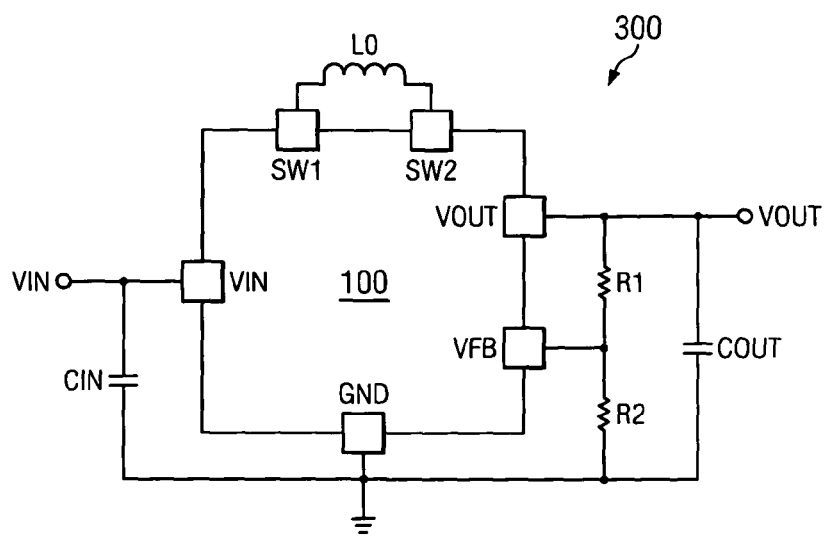
FIG. 3 illustrates an application of a high efficiency current mode DC-DC controller in accordance with one embodiment of the present disclosure.

FIG. 3 illustrates an application of a high efficiency current mode DC-DC controller in accordance with one embodiment of the present disclosure. Application 300 includes controller 100 of FIGS. 1A and 2A implemented within a single integrated circuit package, with inductor L0 connected between input/output connections SW1 and SW2. An input/output connection VIN for receiving the input voltage $V_{IN}$ is coupled by a capacitor CIN to ground, and an input/output connection $V_{OUT}$ for outputting the output voltage $V_{OUT}$ is coupled by a capacitor COUT to ground. The input/output connection VOUT is also coupled to ground by a voltage divider formed by resistors R1 and R2, with an input/output connection VFB for receiving the feedback voltage $V_{FB}$ connected to the junction between resistors R1 and R2.

Figure 4A:
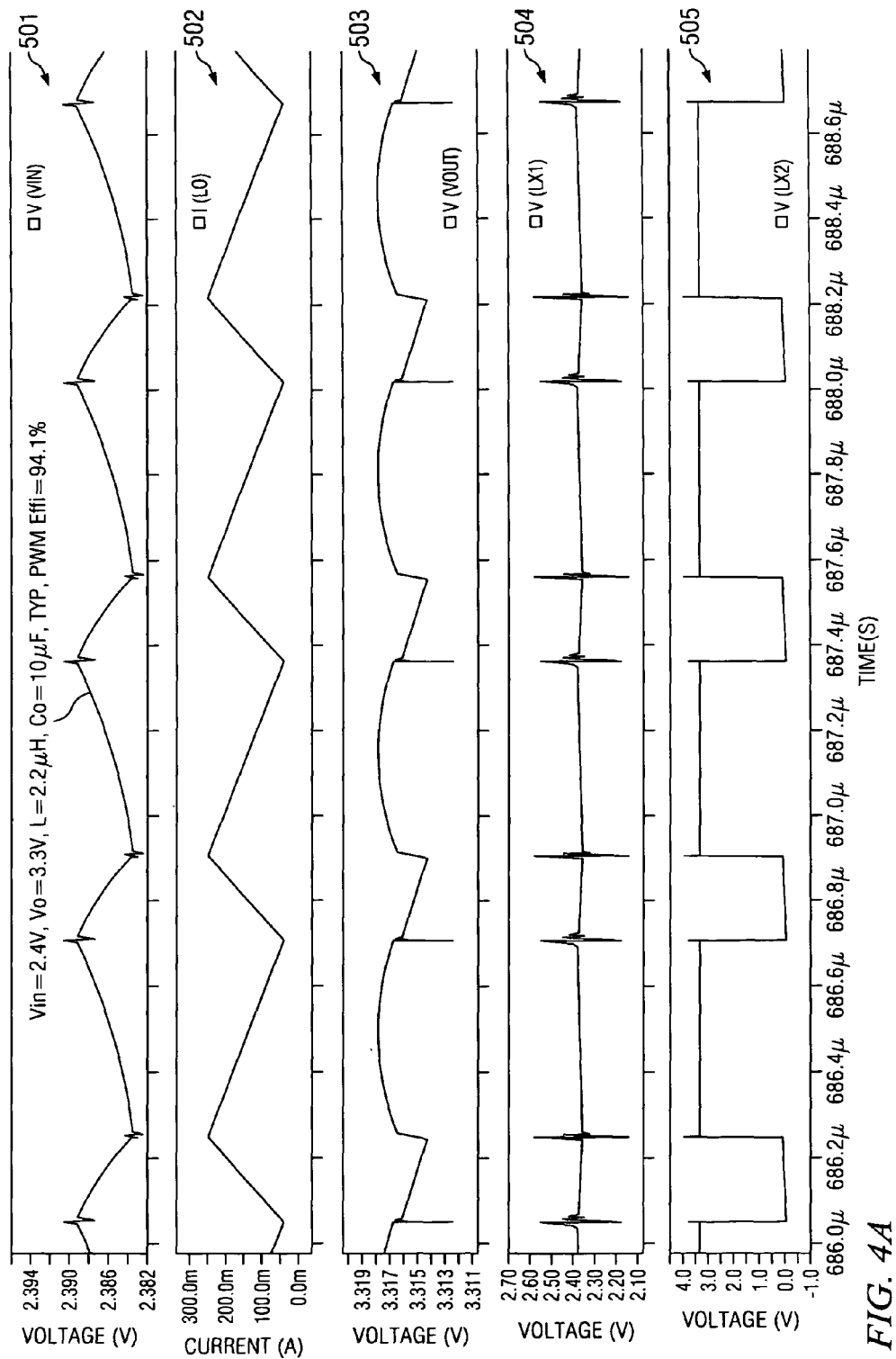
FIGS. 4A through 4C are plots illustrating simulation results for operation of the controller application depicted in FIG. 3.
Figure 4B:
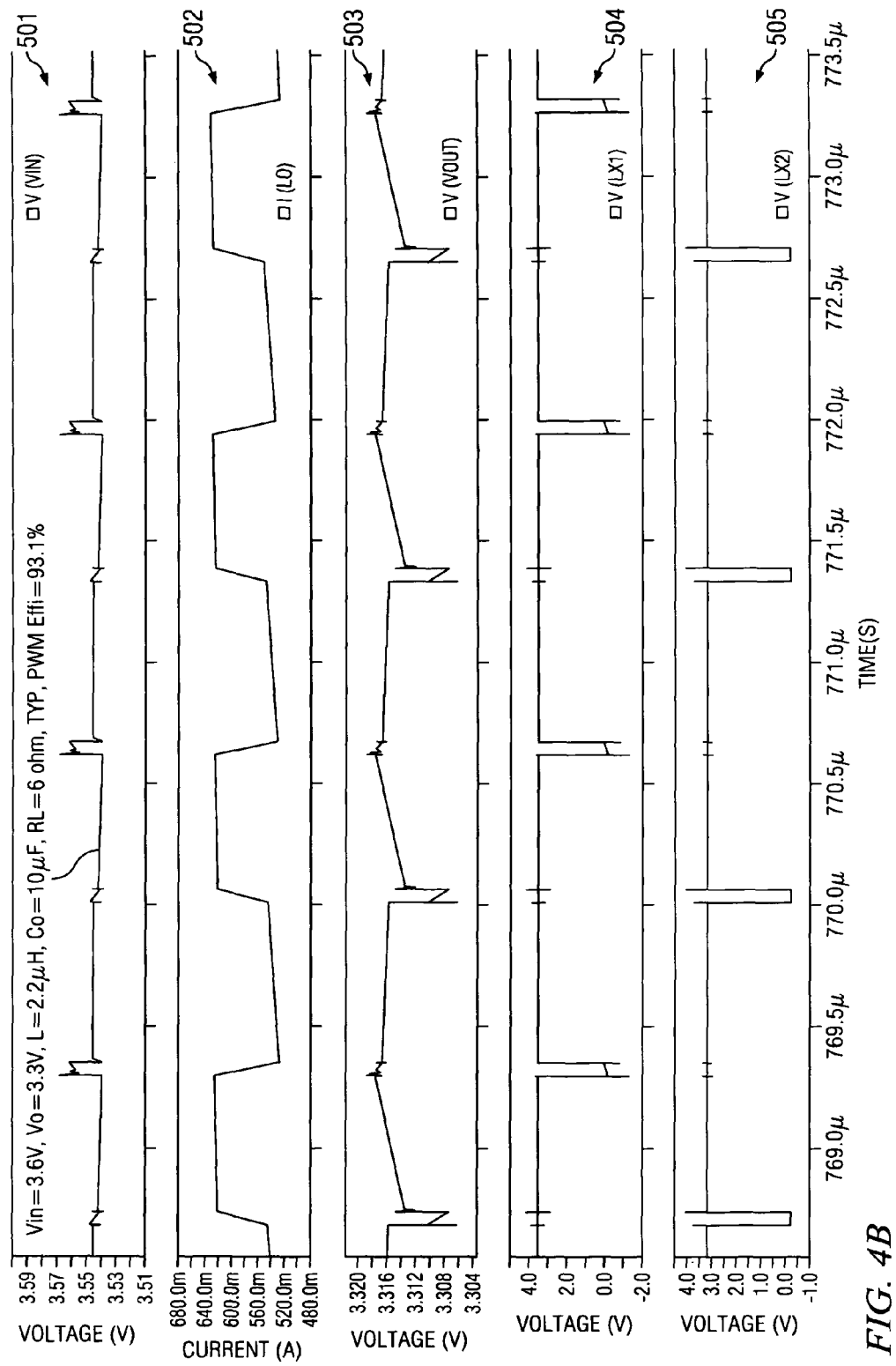
Figure 4C:
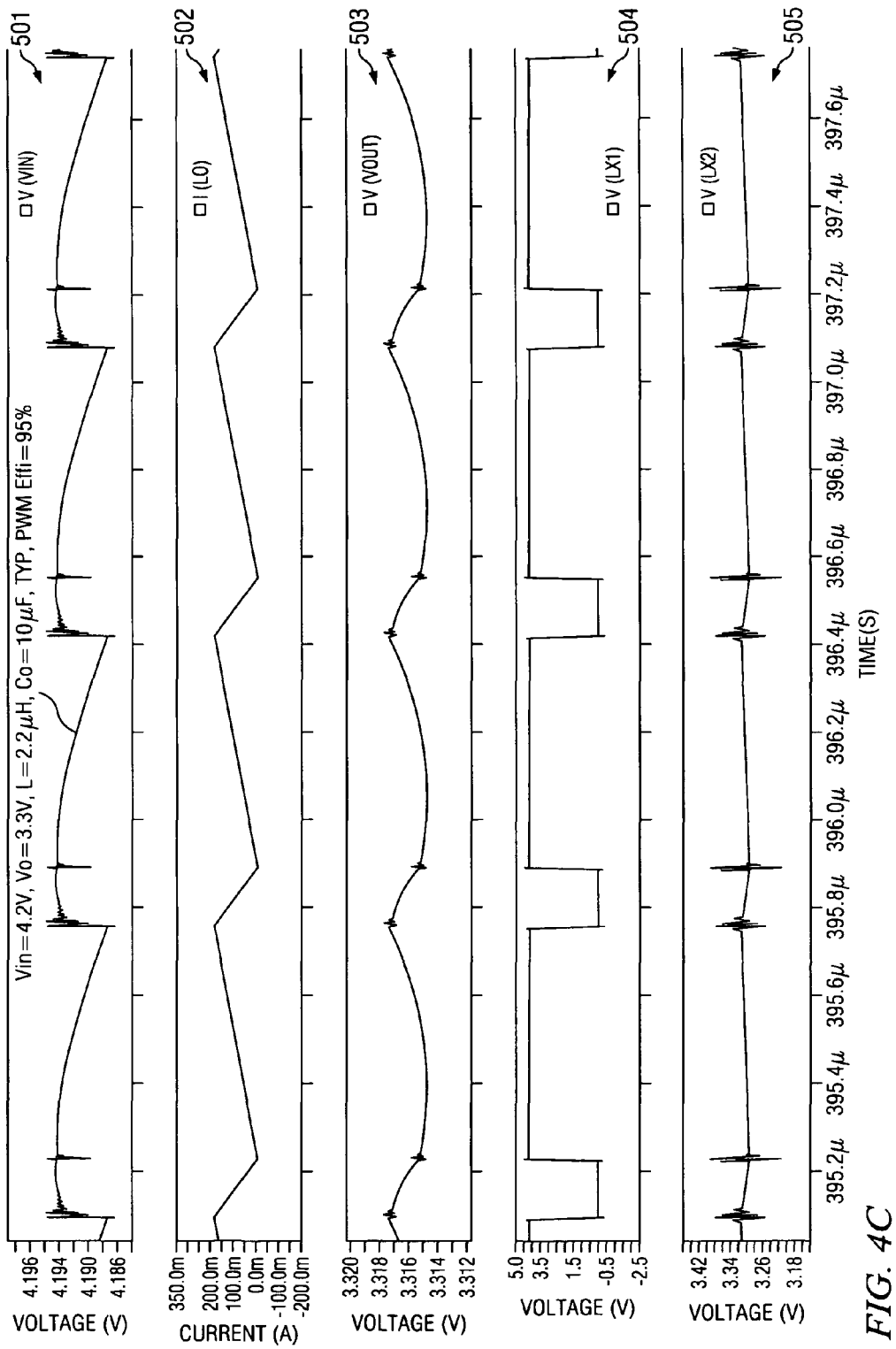

FIGS. 4A through 4C are plots illustrating simulation results for operation of the controller application depicted in FIG. 3. An inductance of 2.2 micro-Henries (µH) was selected for inductor L0 and a capacitance of 10 micro-Farads (µF) was selected for the output capacitor COUT. Within each set of plots: the top trace 501 depicts the input signal $V_{IN}$; the second trace 502 illustrates current I through the inductor L0 between terminals SW1 and SW2; the third trace 503 illustrates the output voltage $V_{OUT}$; and the fourth and fifth traces 504 and 505 illustrate the voltages at terminals SW1 and SW2, respectively.

FIG. 4A illustrates simulation results for an input voltage $V_{IN}$ of 2.4 volts (V) and an output voltage $V_{OUT}$ of 3.3 V, and thus corresponds to operation in the boost region of FIG. 1B. A conversion efficiency of 94.1% is achieved. FIG. 4B illustrates simulation results for an input voltage $V_{IN}$ of 3.6 V and an output voltage $V_{OUT}$ of 3.3 V, corresponding to operation in the buck/boost region of FIG. 1B with a conversion efficiency of 93.1%. FIG. 4C illustrates simulation results for an input voltage $V_{IN}$ of 4.2 V and an output voltage $V_{OUT}$ of 3.3 V, corresponding to operation in the buck region of FIG. 1B with a conversion efficiency of 95%.

The current-mode DC-DC controller described above achieves high conversion efficiency regardless of how close the desired output voltage is to the input voltage. The design also eliminates the need for external compensation, and required very few external components, such that reduced printed circuit board (PCB) area is required.

Although the above description is made in connection with specific exemplary embodiments, various changes and modifications will be apparent to and/or suggested by the present disclosure to those skilled in the art. It is intended that the present disclosure encompass all such changes and modifications as fall within the scope of the appended claims.

What is claimed is:

1. A method of operating a DC-DC controller which includes a plurality of switches including a first switch coupled between an input and a first node, a second switch coupled between the first node and a ground connection, a third switch coupled between the output and a second node, and a fourth switch coupled between the second node and the ground connection, and an inductor coupled between the first and second nodes, comprising: sensing voltage at an output to determine whether an output voltage is within a buck region, a buck-boost region and a boost region; sensing current in the inductor; determining a difference between a feedback voltage derived from the sensed voltage at the output and a reference voltage to generate a first control signal; comparing the sensed current to the first control signal to generate a first reset signal; shifting the first control signal to generate a second control signal; comparing the sensed current to the second control signal to generate a second reset signal; and controlling the plurality of switches to selectively operate the DC-DC controller, based on the sensed voltage, in: a first mode while the sensed output voltage is in the boost region as a boost converter by setting a first subset of the plurality of switches and repeatedly switching a second subset of the plurality of switches, a second mode while the sensed output voltage is in the buck region as a buck converter by setting the second subset of the switches and repeatedly switching the first subset of the switches, and a third mode while the sensed output voltage is in the buck-boost region as a converter by alternating between operation as the boost converter by setting the first subset of switches and repeatedly switching the second subset of switches for a first period of time until reset by the second reset signal and operation as the buck converter by setting the second subset of switches and repeatedly switching the first subset of switches for a second period of time until reset by the first reset signal.

2. The method of claim 1, wherein the input is a supply voltage.

3. The method of claim 1, further comprising:
(a) closing the first switch, opening the third switch, and applying pulse width modulation signals to the second and fourth switches during operation of the DC-DC controller as a boost converter,
(b) closing the second switch, opening the fourth switch, and applying pulse width modulation signals to the first and third switches during operation of the DC-DC controller as a buck converter, and
(c) alternating between (a) and (b) during operation of the DC-DC controller as a converter alternating between boost operation and buck operation.

4. The method of claim 3, wherein the first subset of switches consists of the first and third switches and the second subset of switches consists of the second and fourth switches.

5. The method of claim 1, further comprising: switching power to and from the inductor and producing the feedback voltage using a voltage divider connected to the output.

6. A DC-DC controller, comprising:
a first switch coupled between an input and a first node;
a second switch coupled between an output and a second node;
a third switch coupled between the first node and a ground connection;
a fourth switch coupled between the second node and the ground connection;
an inductor coupled between the first and second nodes;
a current sensing circuit configured to sense current between the first node and the second node;
an error amplifier configured to generate a first control signal indicative of a difference between a feedback voltage derived from a voltage at the output and a reference voltage;
a first comparator configured to compare a current sense signal to the first control signal and generate a first reset signal;
an error shift circuit configured to shift the first control signal to generate a second control signal;
a second comparator configured to compare the current sense signal to the second control signal to generate a second reset signal; and
control logic configured to control switching by the first, second, third and fourth switches to selectively operate in:
a first mode as a boost converter wherein the first and third switches are set and the second and fourth switches are repeatedly switched plural times,
a second mode as a buck converter wherein the second and fourth switches are set and the first and third switches are repeatedly switched plural times, and
a third mode as a converter alternating between operation as the boost converter for a first time period until reset by the second reset signal and operation as the buck converter for a second time period until reset by the first reset signal.

7. The DC-DC controller of claim 6, wherein the control logic is configured (a) to close the first switch, open the third switch, and apply pulse width modulation signals to the second and fourth switches during operation of the DC-DC controller as a boost converter,
(b) to close the second switch, open the fourth switch, and apply pulse width modulation signals to the first and third switches during operation of the DC-DC controller as a buck converter, and
(c) to alternate between (a) and (b) during operation of the DC-DC controller as a converter alternating between boost operation and buck operation.

8. The DC-DC controller of claim 7, further comprising:
a discontinuous mode detection amplifier coupled across the second switch,
wherein the control logic is configured to control switching by the first, second, third and fourth switches based on an output of the discontinuous mode detection amplifier.

9. The DC-DC controller of claim 6, wherein the current sensing circuit comprises a resistance and a fifth switch connected in series, the series-connected resistance and fifth switch connected in parallel with the first switch,
wherein the control logic is configured to switch the fifth switch in tandem with the first switch.

10. A DC-DC controller application including the DC-DC controller of claim 6, the DC-DC controller application further comprising:
a voltage divider connected to the output, the voltage divider configured to produce the feedback voltage.

\* \* \* \* \*